INVENTOR:
Robert J. Anderson

ATTORNEY

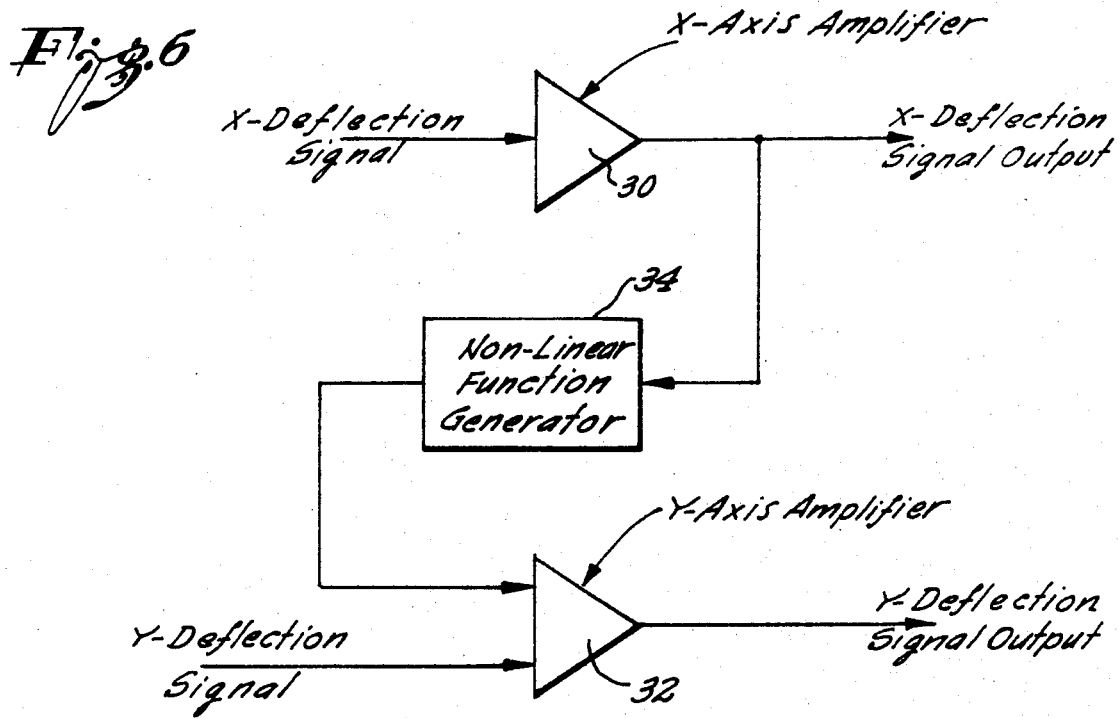

United States Patent Office 3,669,522
Patented June 13, 1972

3,669,522
REFLECTIVE RELAY OPTICAL SYSTEM FOR TWO-AXIS DEFLECTION
Robert J. Anderson, Rockville, Md., assignor to The Singer Company
Filed Mar. 20, 1970, Ser. No. 21,307
Int. Cl. G02b 17/00
U.S. Cl. 350—6                    5 Claims

ABSTRACT OF THE DISCLOSURE

A reflective optical system is provided which serves basically to relay a laser, or other, beam from a first deflector to a second deflector in order to achieve two dimensional scanning of the beam. A spherical mirror is used in the relay system to achieve optical coupling between the two axes of beam deflection. The relay ouptical system of the invention, therefore, is reflective, and is less subject to optical losses, less expensive, and easier to align, than the prior art refractive relay systems. Electronic means may also be provided in the relay system of the invention to compensate for any interaction produced by the system between otherwise orthogonal scan axes.

BACKGROUND OF THE INVENTION

The need for efficient high speed, high resolution two-axis optical beam deflectors has become particularly pronounced in recent years due to the advent of the laser beam. Such deflectors are particularly useful in optical radar systems, laser displays, optical memories, and the like.

In order to achieve two-axis deflection of a laser light beam, two separate one-axis deflectors are generally used. These deflectors are positioned and controlled in the prior art systems to scan orthogonally, and they are optically coupled to one another in a manner such that the beam leaving the first deflector and scanned thereby along a first axis, will remain within the entrance pupil of the second deflector, for any value of the scan angle.

With such prior art equipment, if the scan angle of the first deflector is sufficiently small, and if the entrance pupil of the second deflector is sufficiently large, it is merely necessary to place the two deflectors near one another to achieve the desired optical coupling. However, if the scan angle of the first deflector is relatively large, and if the entrance pupil of the second deflector is relatively small, a relay optical system must be provided in order to intercouple the two deflectors.

The characteristics of the aforesaid relay optical system then affect the overall performance of the entire system. Specifically, if high efficiency of the overall system is to be achieved, both the deflectors and the optical coupling relay must be capable of operating at relatively low light loss, with low distortion of the wave front of the laser or other light beam, and with high deflection accuracy.

In laser display systems, for example, single-axis electro-mechanical deflectors of the moving mirror type, with relatively small pupils or apertures of the order of two millimeters, and with relatively large dynamic scan angles of the order of 40°, are usually required. Therefore, optical relay coupling between the two deflectors is necessary. It is also required that the relay coupling system be capable of performing to the desired resolution of the overall display system.

The resolution of a laser display system is a function of the divergence due to defraction effects introduced by the limiting aperture of the deflection system. Using the Rayleigh criterion, the number of resolvable elements per axis is given by the following equation:

$$N = \theta/\phi \qquad (1)$$

where:

$\theta$ is the total dynamic angular scan; and
$\phi$ is the divergence half-angle.

The divergence half-angle is given by the equation:

$$\phi = \frac{\epsilon\lambda}{\alpha} \qquad (2)$$

where:

$\lambda$ is the wavelength of the scanned beam;
$\alpha$ is the limiting aperture of the deflector; and
$\epsilon = 1.22$ for a uniformly illuminated circular aperture,
$\epsilon = 1.27$ for a Gaussian intensity distribution.

Combining Equations 1 and 2 yields the following equation:

$$N = \frac{\theta\alpha}{1.27\lambda} \qquad (3)$$

which is the theoretical resolution limit of a laser scanning system, in which the factor, 1.27, for a Gaussian intensity distribution has been used. Although the dynamic scan angle, $\theta$, may be increased or decreased by using appropriate optics, the resolution, N, is invariant.

It is apparent from Equation 3 that a given resolution may be obtained in either of two ways. First, by utilizing a small dynamic scan angle with a large aperture, or, alternatively, by scanning a small aperture over a large dynamic scan angle.

A useful figure of merit for optical bean deflectors is the product of the bandwidth, that is the scan rate, and the resolution. In the scanning systems referred to above using electro-mechanical reflectors to deflect the beam, such systems have been operated with bandwidth-resolution products as high as $10^8$ resolution elements per second. Such deflectors usually take the form of a small mirror having, for example, a 2 millimeter clear aperture, mounted on a galvanometer suspension with very high natural frequency. Resolution-bandwidth products as high as $5 \times 10^6$ are easily obtained with devices of this type, while random access to any resolvable element is easily achieved.

For deflectors using the aforesaid technique, the deflection bandwidth is a sensitive function of the mirror function, and therefore, of the clear aperture. Therefore, the clear aperture must be limited to a few millimeters thereby requiring that the total dynamic scan angle be large to assure adequate resolution. Typically, it has been found that optimum results are obtained with a clear aperture of two millimeters, and a total dynamic scan angle of approximately 40°. The deflection bandwidth associated with the device is then of the order of 5 kHz.

BRIEF DESCRIPTION OF THE DRAWINGS

FIG. 6 is a block diagram of an electronic circuit which may be incorporated into the system to correct an interaction between the two orthogonal deflection axes.

DETAILED DESCRIPTION OF THE ILLUSTRATED EMBODIMENT

Figure 1:
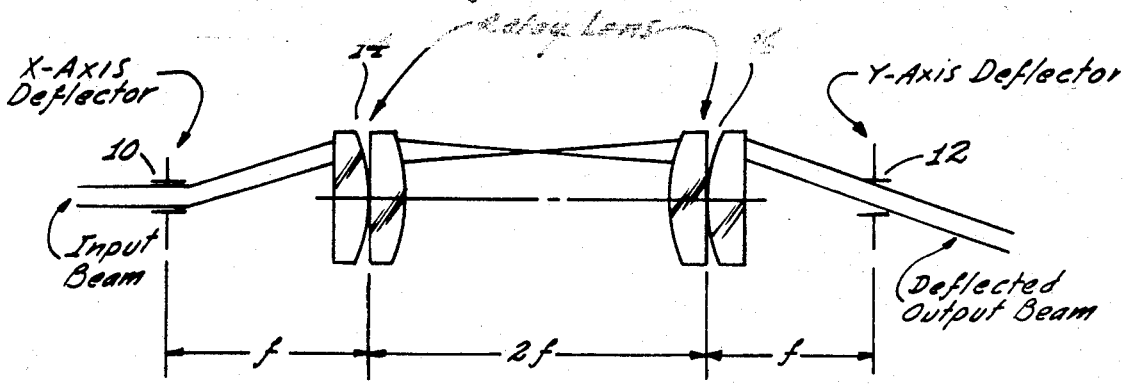
FIG. 1 is a schematic representation of a prior art two-axis deflection system, and using refractive optical elements to relay the exit aperture of the first deflector into the entrance aperture of the second deflector.

The series of relay optics shown in FIG. 1 is representative of the prior art system used, as indicated above, to couple the output of the X-axis scanner, or deflector 10, to the input of the Y-axis scanner or deflector 12. As also indicated, the illustrated optical elements in FIG. 1 serve the purpose of relaying the exit aperture of the X-axis deflector into the entrance aperture of the Y-axis deflector. This is achieved in the illustrated prior art system by using two identical lenses 14 and 16, the lenses being spaced from the deflectors and from one another, as indicated, where "$f$" is the focal length of the lenses.

As indicated above, the function of the relay coupling lens 14 and 16 is to cause the beam deflected by the X-axis scanner 10 to fall within the entrance pupil of the Y-axis scanner 12. The relay lenses 14 and 16 serve to image the exit pupil of the X-axis deflector 10 into the entrance pupil of the Y-axis deflector 12, thereby assuring complete optical coupling over the full dynamic scan range of the system. Since the field angle $\gamma$ of the lens system is given by $$\tan \gamma/2 = A/2f \quad (4)$$

where:

A is the lens clear aperture; and
$f$ is the focal length;

and relay lenses are available with aperture on the order of the $f/1.2$, therefore, dynamic scan angles as large as 45° are easily accommodated, allowing high resolution with small deflector apertures.

Although prior art systems of the type shown in FIG. 1 have been designed and tested, it has been found that the various optical elements have been difficult to align and mount, and light losses have been relatively high. The drawbacks inherent in the prior art system of FIG. 1 led to the concept of the present invention, in which the optical coupling is a reflective relay system, rather than refractive. By using reflective optics, the number of elements in the relay may be reduced. In addition, the light losses are reduced as compared with the refractive prior art system, and alignment and mounting problems are also alleviated.

Specifically, the reflective elements in the relay system help maximize the transmission of the light wavelengths of the beam since the number of surfaces is reduced, and the surfaces are more easily coated. In the systems to be described, only two mirrors are used in the relay system, which makes easy adjustments using commercially available mounting components feasible and effective.

Figure 2:
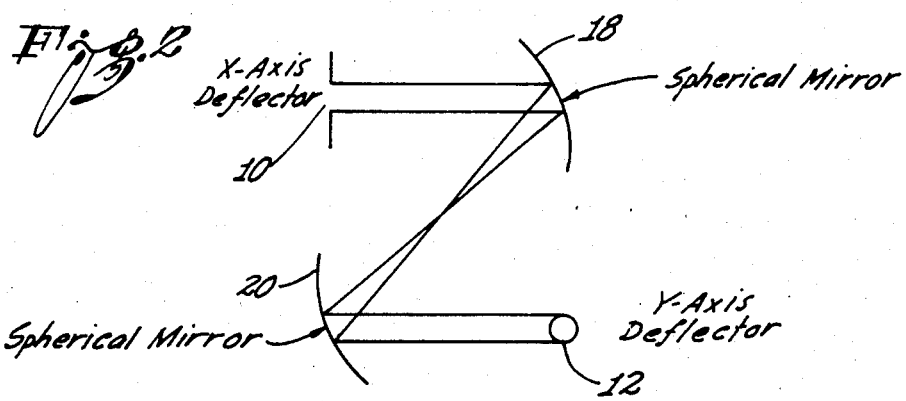
FIG. 2 is a schematic representation of a two-axis deflection system for a light beam incorporating the concepts of the present invention, and in which the prior art refractive optical elements of FIG. 1 are replaced by spherical mirrors.
Figure 3:
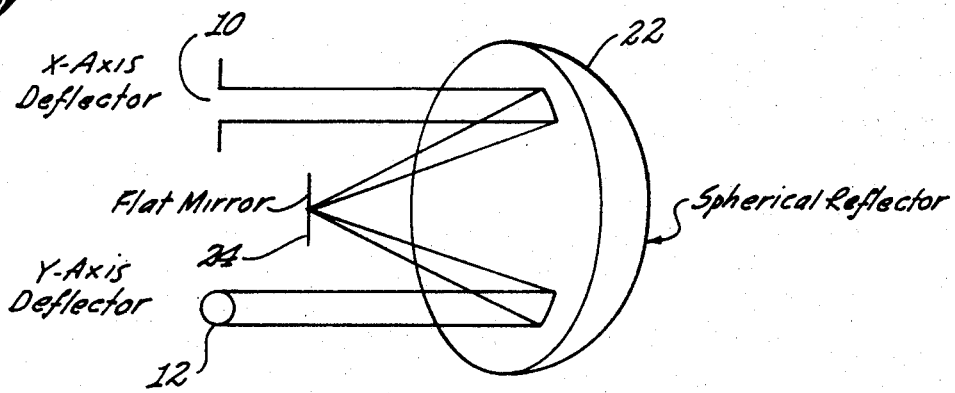
FIG. 3 is a schematic representation of a two-axis deflection system incorporating a second embodiment of the invention, and in which one of the spherical mirrors of the system of FIG. 2 is replaced by a flat mirror.

In the system shown in FIG. 2, for example, the lenses 14 and 16 of FIG. 1 are replaced by two spherical mirrors 18 and 20 which are oriented confocally; whereas in the embodiment of FIG. 3, the prior art lenses are replaced by a spherical reflector 22 and a flat mirror 24. As mentioned above, the system of FIG. 3 is shown in somewhat more detail in FIG. 4, whereas the geometry of the system is shown in FIG. 5.

Figure 4:
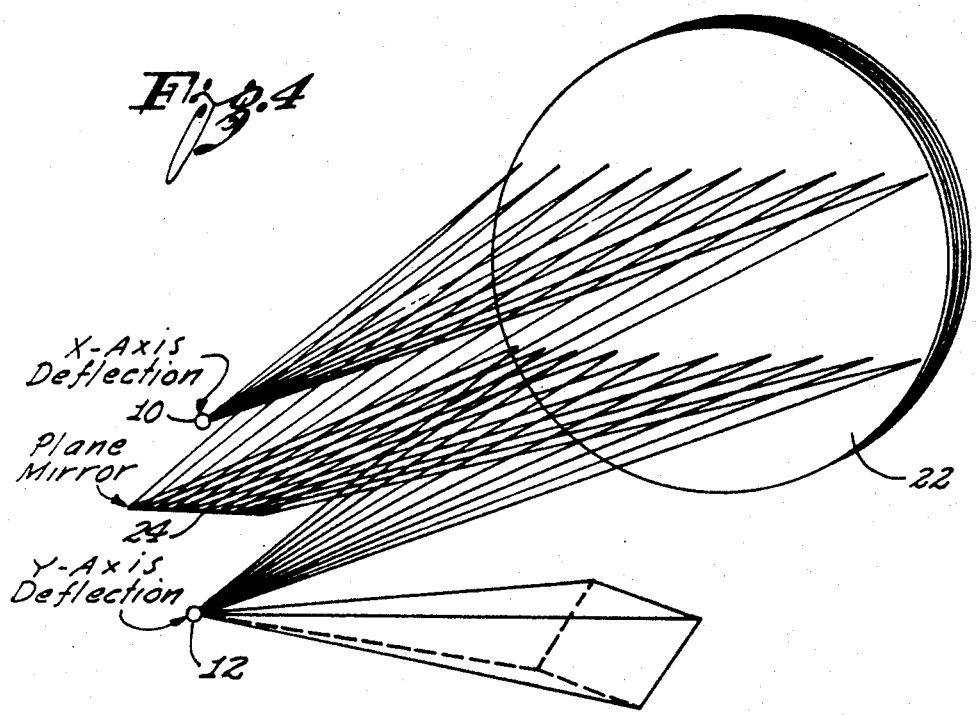
FIG. 4 is a representation in somewhat more detail of the system of FIG. 3.
Figure 5:
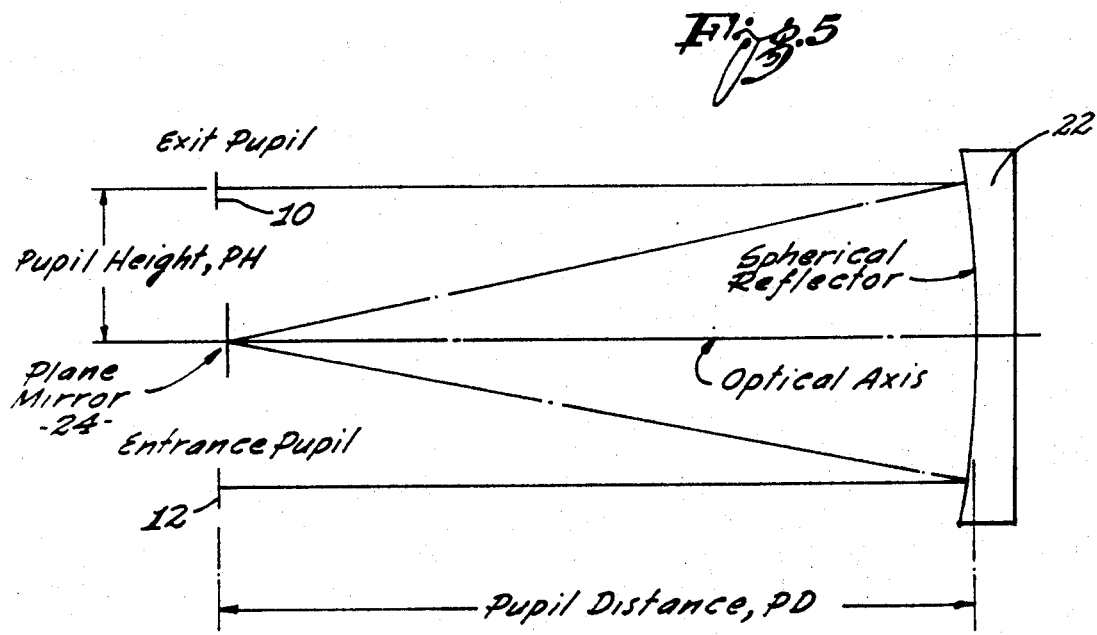
FIG. 5 is a further representation of the system of FIG. 1 and illustrating the various parameters of the aforesaid system.

In a particular constructed embodiment of the system of FIGS. 3-5, a collimated laser beam of approximately two millimeters in diameter is deflected ±20° across the spherical reflector 22. This is achieved by means of a galvanometer mirror constituting the X-axis deflector 10, which is displaced from the optical axis of the spherical reflector 22 by a distance indicated by the pupil height PH. The beam is then redirected and focussed on the plane mirror 24, which is located on the axis of the spherical reflector 22 at the primary focus point of the spherical reflector. The beam is redirected from the plane mirror 24 back to the spherical mirror 22. It is recollimated by the spherical mirror to the entrance pupil of the Y-axis deflector 12, which is located a distance PH from the surface of the spherical reflector 22.

The small effective aperture of the system of FIGS. 3-5 alleviates the requirement for extreme field flatness that is normally encountered in such a relay system. However, additional resolution may be achieved by correcting the surface of the plane mirror 24 to compensate for any lack of field flatness. A prototype of the reflective system of FIGS. 3-5 has been constructed, and has been found to be capable of resolutions of greater than 1,000 resolvable elements per axis, with a two millimeter aperture, and with an accuracy of greater than 0.5%.

Due to the fact that the scanned beam enters the relay at an off-axis position, the relay system causes some interaction between the otherwise orthogonal scan deflection axes. This interaction is evidenced by a curvature in the line scanned through the axis that passes through the relay system. Hence, we see that for any given value of X-axis deflection, the beam is also deflected in the Y-axis direction by some "error" angle introduced by the relay system. This inter-action between the X and Y axes becomes smaller as the pupil height PH decreases, and is a function of both the pupil height and the X deflection angle.

The aforesaid inter-action may be removed by applying an appropriate Y-correction angle to the beam which is opposite in sign to the error signal. This may be achieved, for example, by the electronic control system shown in FIG. 6. In the system of FIG. 6, the electrical signal which produces the deflection of the X-axis deflection is passed through a usual amplifier 30, and is then applied to the galvanometer controlling the X-axis deflector. Likewise, the electrical signal which produces the Y-axis deflection is passed through an amplifier 32, and is then applied to the galvanometer controlling the Y-axis deflector 12.

In order to provide the compensating deflection for the Y-axis deflector during the X-axis scan, the output of the amplifier 30 is applied to a non-linear function generator 34, the output of which is also applied to the Y-axis amplifier 32. The function generator 34 is adjusted so that during the X-axis scan, the Y-axis deflector 12 is controlled to produce a compensating deflection in the Y-axis direction. Specifically, the system of FIG. 6 applies an appropriate Y correction angle to the system which is opposite in sign to the aforesaid error angle.

The non-linear function generator 54 may be set to achieve the desired correction by observing a line scanned through the flow X-axis dynamic scan angle, and applying a correction until the line is straight within the desired tolerances. Typically, deflection accuracy of at least 0.5% of full scale is desired, thereby necessitating correction to the Y-axis deflection angle of better than 0.2°. Since the full range of the Y-axis error is less than 1.0°, on the primary focal surface, the correction angle can be easily made to such an accuracy.

The invention provides, therefore, an improved optical system for the two-axis deflection of a light beam, such as laser beam, and which includes a reflective relay optical system to provide a simple, low cost coupling of the axes in a high performance light beam deflector.

High resolution has been achieved in systems constructed in accordance with the concepts of the invention, as well as a high degree of linearity. Moreover, light losses have been minimized and alignment difficulties alleviated. The low effective $f$/number of the relay of the invention minimizes the field-flatness requirements. Moreover, the plane mirror 24 described above can incorporate surface corrections to compensate for field-flatness correction, if necessary. The elimination of the refractive elements in the optical relay eliminates the need for chromatic correction, and allows the system to be used throughout a wide range of wavelengths.

While particular embodiments of the invention have been shown and described, modifications may be made. It is intended in the following claims to cover all embodiments which come within the spirit and scope of the invention.

What is claimed is:

1. In a two-axis optical beam deflection system, and which includes a first optical beam deflector for deflecting an optical beam along a first axis, and a second optical beam deflector for deflecting the optical beam along a second axis which is essentially orthogonally related to said first axis; an optical relay system for causing the optical beam deflected by said first deflector to fall within the entrance aperture of said second deflector, said relay system including: first reflector means having a concave spherical shaped surface positioned so that said optical beam is deflected across the surface thereof by said first deflector; and second reflector means positioned on the axis of said first reflector means and at the primary focus point thereof to receive the reflected beam from said first reflector means and to redirect said beam to said first reflector means to be redirected thereby to the entrance aperture of said second deflector.

2. The system defined in claim 1, in which said second reflector means has an essentially planar surface configuration.

3. The system defined in claim 2, in which the surface of said second reflector means is configured to compensate for scanning irregularities in the system.

4. The system defined in claim 1, in which said first and second beam deflectors are driven by electro-mechanical means, and which includes an electronic system for supplying electrical deflection signals thereto.

5. The system defined in claim 4, in which said electric system includes a non-linear correction network to compensate for inter-actions between the beam deflections along said first and second axes.

References Cited
UNITED STATES PATENTS

| | | | |
|---|---|---|---|
| 3,448,458 | 6/1969 | Carlson et al. | 350—6 |
| 3,240,111 | 3/1966 | Sherman et al. | 350—294 |
| 3,533,701 | 10/1970 | Hruby et al. | 350—299 |
| 2,860,557 | 11/1958 | Moore et al. | 350—175 TS |
| 3,420,594 | 1/1969 | Chapman | 350—7 |

DAVID SCHONBERG, Primary Examiner

M. J. TOKAR, Assistant Examiner

U.S. Cl. X.R.

350—202, 293